United States Patent [19]

Ban

[11] Patent Number: 5,409,283
[45] Date of Patent: Apr. 25, 1995

[54] BODY MOUNTING STRUCTURE FOR PREVENTING HORIZONTAL DISPLACEMENT OF AUTOMOTIVE VEHICLE

[75] Inventor: Yukimasa Ban, Zama, Japan

[73] Assignee: Nissan Motor Co., Ltd., Yokohama, Japan

[21] Appl. No.: 114,622

[22] Filed: Sep. 1, 1993

[30] Foreign Application Priority Data

Sep. 18, 1992 [JP] Japan .................. 4-249693

[51] Int. Cl.⁶ .................................. B62D 27/04
[52] U.S. Cl. .................. 296/35.1; 248/580; 248/635; 180/312
[58] Field of Search ............ 296/35.1, 35.3, 190; 248/580, 581, 635; 180/312

[56] References Cited

U.S. PATENT DOCUMENTS

| 1,977,896 | 10/1934 | Saurer . | |
| 3,105,717 | 10/1963 | Schilberg | 296/35.1 |
| 3,177,032 | 4/1965 | Jaskowiak | 296/35.1 |

FOREIGN PATENT DOCUMENTS 61-158573 10/1986 Japan .
68475 3/1988 Japan ............... 296/35.1
766943 10/1980 U.S.S.R. ............... 296/190

Primary Examiner—Dennis H. Pedder
Attorney, Agent, or Firm—Foley & Lardner

[57] ABSTRACT

A body mounting structure of an automotive vehicle includes upper and lower insulators disposed on and below a mount bracket fixed to a vehicle frame. A floor panel forming part of a vehicle body is securely mounted on the upper insulator. A vertical bolt is disposed passing through the insulators, the mount bracket and the floor panel thereby to connect them as a single unit. The bolt has a bolt head located below the lower insulator and provided with a cup-shaped washer for the bolt head. Additionally, a stopper bracket fixed to the vehicle frame. It extends below the lower insulator and is formed with a support hole. The cup-shaped washer is located inside the periphery of the support hole in such a manner that it comes into contact with the periphery of the support hole when a large horizontal force input is made to the vehicle frame or the vehicle body, thereby suppressing a generally horizontal displacement between the vehicle frame and the vehicle body.

3 Claims, 5 Drawing Sheets

BODY MOUNTING STRUCTURE FOR PREVENTING HORIZONTAL DISPLACEMENT OF AUTOMOTIVE VEHICLE

BACKGROUND OF THE INVENTION

1. Field of the Invention

This invention relates to improvements in a body mounting structure of an automotive vehicle, and more particularly to a device for suppressing a relative displacement between a vehicle frame and a vehicle body, used in the body mounting structure.

2. Description of the Prior Art

Hitherto a variety of body mounting structures of an automotive vehicle have been proposed and put into practical use. A typical one of them is disclosed in Japanese Utility Model Provisional Publication No. 61-158573 described as follows. The vehicle frame includes a pair of frame members which are located generally parallel and extend in a fore-and-aft direction of the vehicle. Each frame member is provided with several mount brackets for the vehicle body including a floor panel. Upper and lower insulators are securely disposed respectively on and below each mount bracket. A bolt is disposed vertically passing through the mount bracket and the insulators to securely connect them as a single unit. The floor panel is mounted on each upper insulator and fixed there by the bolt. Thus, the floor panel is elastically supported on the frame members through the insulators and the mount bracket. Accordingly, a force input during a bounce of the vehicle can be absorbed by the upper insulator whereas a force input during rebound of the vehicle can be absorbed by the lower insulator. Additionally, the vertical bolt can restrict a relative displacement in the fore-and-aft direction made between the vehicle frame and the floor panel during an abrupt vehicle starting, an abrupt vehicle braking, an abrupt vehicle turning, or the like.

However, difficulties have been encountered in this conventional body mounting structure. The vertical bolt can restrict to some extent the relative displacement between the vehicle frame and the floor panel; however, the vertical bolt is fixed only at an intermediate point corresponding to the mount bracket so that any displacement restriction is made to the lower end section of the bolt. Accordingly, when a large force input is made to either one of the vehicle frame (or the mount bracket) and the floor panel, the bolt is rotationally inclined around the above-mentioned intermediate point thereby providing the possibility of increasing a relative displacement amount between the floor panel and the vehicle frame. In order to prevent the relative displacement from increasing, the rigidity of the whole body mounting structure is raised by providing a variety of reinforcing members for the mount bracket and/or to the insulators. However, this affects the inherent input force absorbing ability of the insulators.

SUMMARY OF THE INVENTION

It is an object of the present invention to provide an improved body mounting structure of an automotive vehicle, which can overcome the drawbacks encountered in conventional similar body mounting structures of an automotive vehicle.

Another object of the present invention is to provide an improved body mounting structure of an automotive vehicle, which can effectively reduce a relative displacement between a vehicle frame and a vehicle body without affecting an inputted force absorbing ability of insulators used in the body mounting structure.

A body mount structure of the present invention is intended for use in an automotive vehicle including a vehicle frame. A mount bracket is fixed to the vehicle frame. Upper and lower insulators are respectively disposed on and below the mount bracket. A part of a vehicle body is fixedly mounted on the upper insulator. A bolt means extends generally vertically and passes through the mount bracket and the upper and lower insulators to securely connect them as a unit. The bolt means has a lower end section projected downwardly from the lower insulator. Additionally, a stopper bracket is fixed to the vehicle frame and extends to be contactable with the bolt means lower end section. The stopper bracket is so constructed as to restrict a generally horizontal movement of the bolt means lower end section and allow a generally vertical movement of the bolt means lower end section.

Thus, according to the present invention, by virtue of the stopper bracket which can restrict the generally horizontal movement of the bolt means for the lower end section, a relative displacement between the vehicle frame and the vehicle body can be suppressed or made small. Additionally, since the stopper bracket allows the generally vertical movement of the bolt means lower end section, an inputted force absorbing ability cannot be affected thereby maintaining a good shock absorbing ability during bound and rebound of the vehicle.

BRIEF DESCRIPTION OF THE DRAWINGS

In the drawings, like reference numerals designate like parts and elements throughout all the figures, in which.

DETAILED DESCRIPTION OF DRAWINGS

Figure 1:
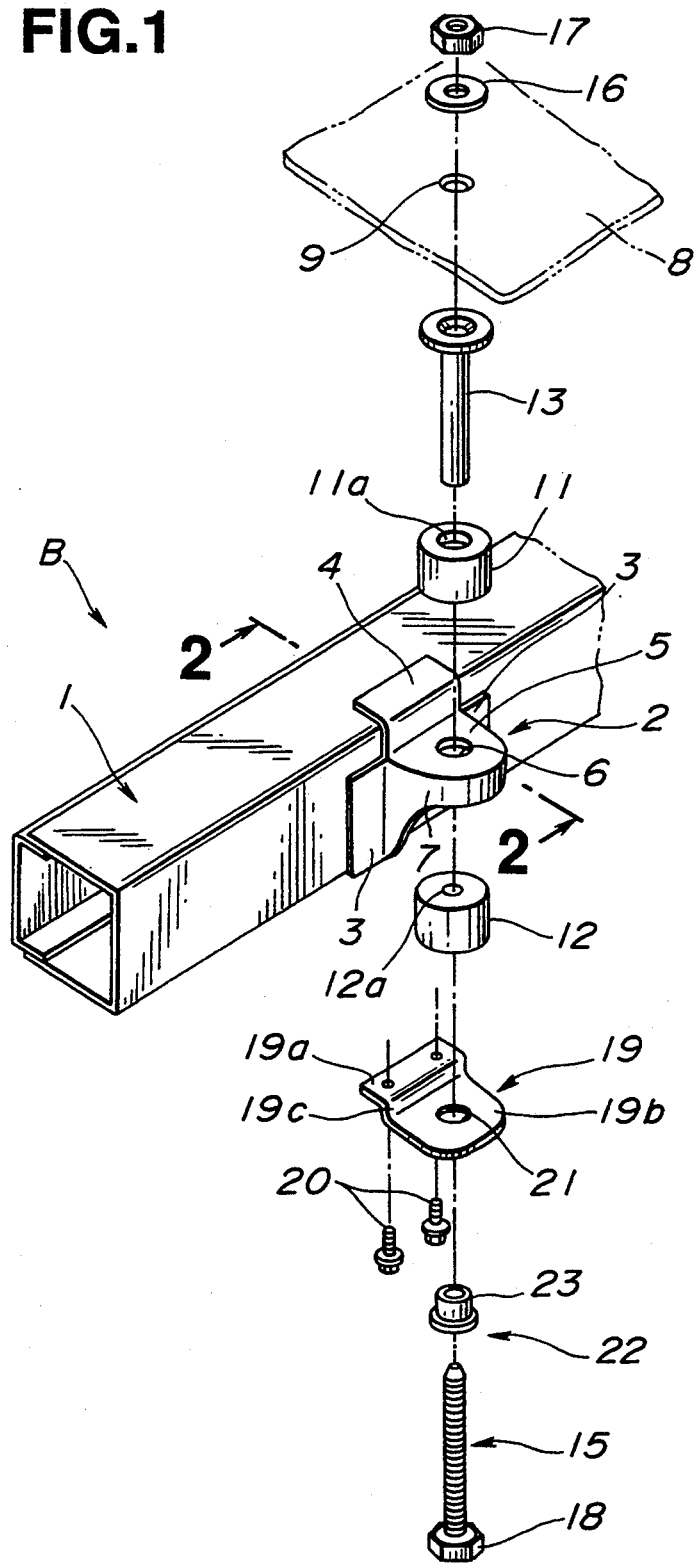
FIG. 1 is a fragmentary exploded perspective view of an embodiment of a body mounting structure of an automotive vehicle, in accordance with the present invention.
Figure 2:
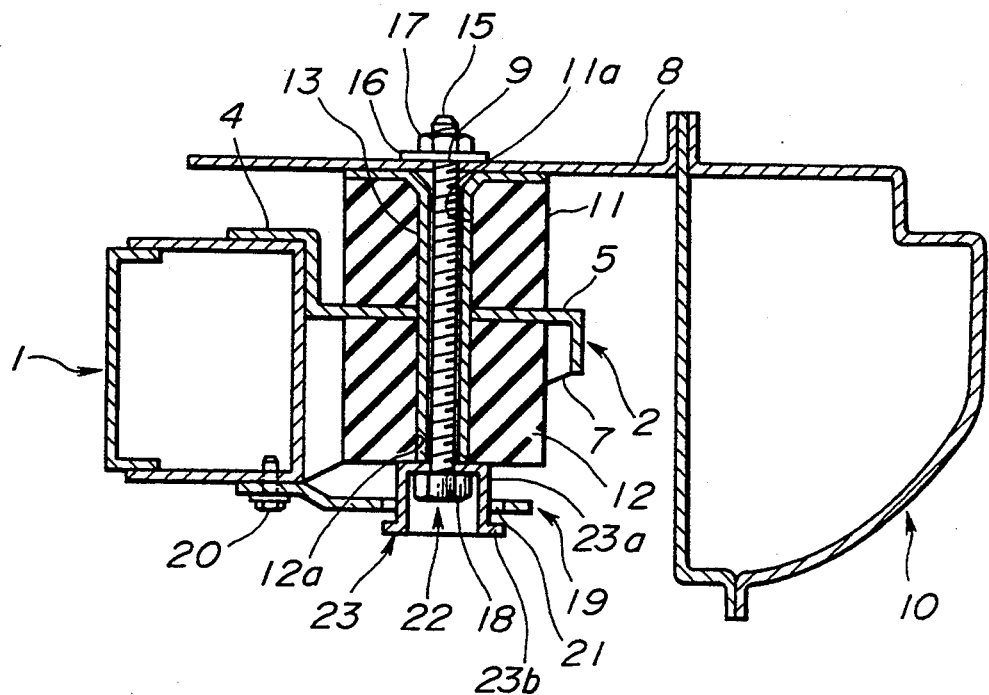
FIG. 2 is a fragmentary sectional view taken in the direction of arrows substantially along the line 2—2 of FIG. 1.

Referring now to FIGS. 1 and 2, an embodiment of a body mounting structure of an automotive vehicle (not shown), according to the present invention is illustrated by the reference character B. The body mounting structure B comprises a pair of vehicle frame members 1 (only a structure on the left side of the vehicle is shown) which form part of a vehicle frame and are located generally parallel to and extend in a fore-and-aft direction of, the vehicle. The vehicle body frame member 1 has a rectangular and closed-loop sectional shape. Several mount brackets 2 are fixed to the vehicle body frame member 1 at the outside surface relative to the vehicle, and aligned at predetermined intervals of a predetermined distance in the fore and aft direction. One of the mount brackets 2 shown in FIGS. 1 and 2 is located at a position rear of an engine compartment (not shown).

The mount bracket 2 includes a horizontal section 5 formed with a circular hole 6. A pair of flange sections 3 are integral with the horizontal section 5 and located respectively at the front and rear sides of the horizontal section 5. The flange sections 3 are joined to the outer and side surface of the vehicle body frame member 1. Each of a pair of downwardly extending ribs 7 is integral with the horizontal section 5 and integrally connects the horizontal section 5 and the flange section 3.

A floor panel 8 forming part of the vehicle body is supported to the vehicle frame member 1 through the mount brackets 2, and formed with an installation hole 9 located an a position corresponding to the hole 6 of the mount bracket 2. A side sill 10, having a closed-loop sectional shape, is connected to the floor panel 8 and located outside of the floor panel 8 relative to the vehicle.

The floor panel 8 is installed to the mount brackets 2 in the following procedure: First, cylindrical upper and lower insulators 11, 12 having central holes 11a, 12a are respectively installed on and below the horizontal section 5 of the mount bracket 2. The insulators 11, 12 are made of an elastomeric material. Then, a generally cylindrical collar 13 is inserted from the upper side through the central holes 11a, 12a of the respective insulators 11, 12 and the hole 6 of the mount bracket horizontal section 5. Thereafter, a bole 15 is inserted from the lower side into the collar 13 through a generally cup-shaped washer 23 so that the upper end section of the bolt 15 projects upward of the collar 13. The projecting upper end section of the bolt 15 is inserted into the installation hole 9 of the floor panel 8 so that an upper part of the bolt upper end section projects upward of the floor panel 8. A nun 17 is engaged on the upper park of the bolt upper end section with a washer 16, and tightened. Accordingly, the floor panel 8 is securely connected to the mount brackets 2 through the insulators 11, 12, thus allowing the floor panel 8 to be supported on the vehicle frame members 1.

In this embodiment, a plurality of stopper brackets 19 (only one shown) are provided respectively for each mount bracket 2. Each stopper bracket 19 is fixedly secured to the lower wall of the vehicle frame member 1 with two bolts 20. The stopper bracket 19 includes a horizontal base section 19a which is fixed to the lower wall of the vehicle frame 1. A horizontal tip end section 19b is integral with the base section 19a through an inclined or sloped connecting section 19c. The tip end section 19b is slightly lower in level than the base section 19a, and is formed with a circular support hole 21. In this embodiment, the cup-shaped sleeve 23 includes a cup-shaped body section 23a which is formed at its bottom portion with a hole (no numeral), through which the bolt 15 passes. A bolt head 18 of the bolt 15 is located inside the cup-shaped body section 23a in such a manner as to be in contact with the bottom portion of the washer cup-shaped section 23a, the bottom portion is in contact with a bolt head 18 of the bolt 15.

An annular flange section 23b is integral with the open end annular edge of the cup-shaped body 23a.

The stopper bracket 19 is located in such a manner that the cup-shaped section 23a is located in the support hole 21 thereof without contacting therewith under a normal state any force acting on the body mounting structure B. More specifically, the generally cylindrical wall portion (no numeral) of the cup-shaped section 23a of the washer 23 is located inside an inner periphery (defining the support hole 21) of the stopper bracket 19 and separate from the inner periphery to form an annular space (no numeral) between the outer peripheral surface of the cylindrical wall portion of the cup-shaped washer 23 and the inner periphery of the stopper bracket 19 in a state where no relative displacement in a generally horizontal direction (particularly in FIG. 2) is applied between the vehicle frame member 1 and the floor panel 8 forming part of the vehicle body. The reference numeral 22 denotes a bolt arrangement or means which functions to connect the floor panel 8 and the mount bracket 2 (or the vehicle frame 1) and therefore includes the bolt 15, the nut 17, the collar 13, the washer 23 and the like.

With the vehicle body mounting structure B discussed above, the floor panel 8 is supported through the upper and lower insulators 11, 12 by the mount bracket 2 fixed to the vehicle frame member 1. Accordingly, a force input during bound of the vehicle is absorbed by the upper insulator 11, whereas a force input during rebound of the vehicle is absorbed by the lower insulator 12, so that the relative displacement in a generally vertical direction between the vehicle frame 1 and the floor panel 8 can be effectively absorbed.

Figure 3:
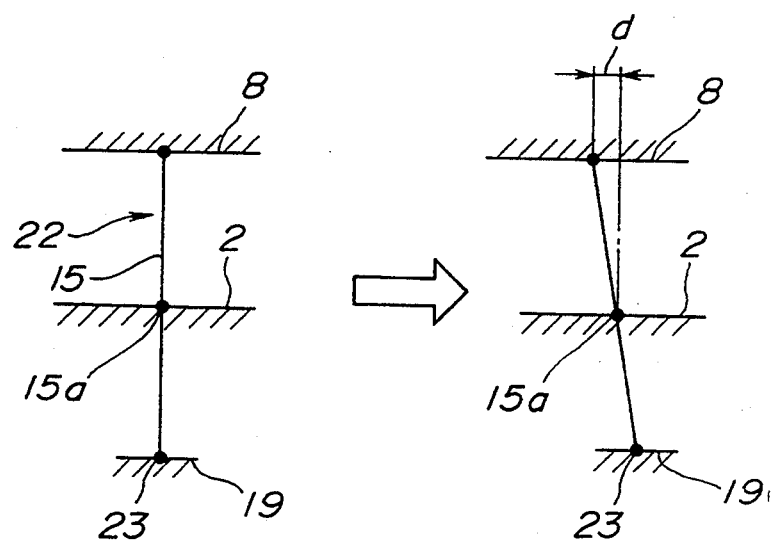
FIG. 3 is a schematic illustration showing the principle of the present invention.
Figure 4:
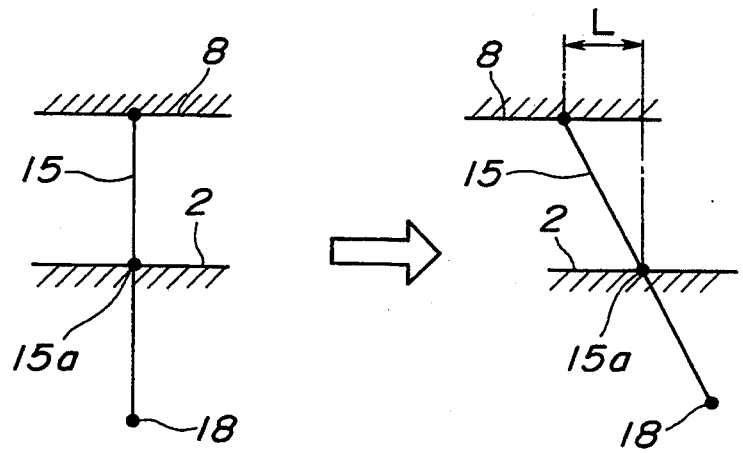
FIG. 4 is a schematic illustration similar to FIG. 3 showing the principle of a conventional body mounting structure.

In this state, if a large force input is made to the floor panel 8 or the vehicle frame 1, it seems that a large relative displacement is caused between the floor panel 8 and the vehicle frame 1. However, by virtue of the stopper bracket 19, when such a large force input is made, the cup-shaped washer 23 moves slightly horizontally and immediately thereafter comes into contact with the periphery of the support hole 21 of the stopper bracket 19, so that a further movement of the cup-shaped washer 23 is restricted. As shown in FIG. 3, illustrating the principle of this embodiment, a relative displacement d between the floor panel 8 and the mount bracket 2 (or the vehicle frame member 1) is small since the bolt 15 is restricted at its lower end section from any considerable displacement. In FIG. 3, the reference numeral 15a indicates an intermediate point of the bolt 15, which point is supported by the mount bracket 5. In this regard, assume that the bolt 15 is supported only at the intermediate point 15a as shown in FIG. 4, which corresponds to the case of a conventional vehicle body mounting structure as discussed in the description of the prior are of the present application. In this conventional case, a relative movement L (corresponding to that of d of the first embodiment) is considerably larger as compared with the present invention.

In the above embodiment of the present invention, in a state that no relative displacement is made between the floor panel 8 and the mount bracket 5 (or the vehicle frame 1), the cup-shaped washer 23 and the periphery of the support hole 21 of the stopper bracket 19 are maintained in a separate state. Therefore, the inherent inputted force absorption ability due to the insulators 11, 12 cannot be affected thereby displaying a sufficient vibration insulation effect.

Figure 5:
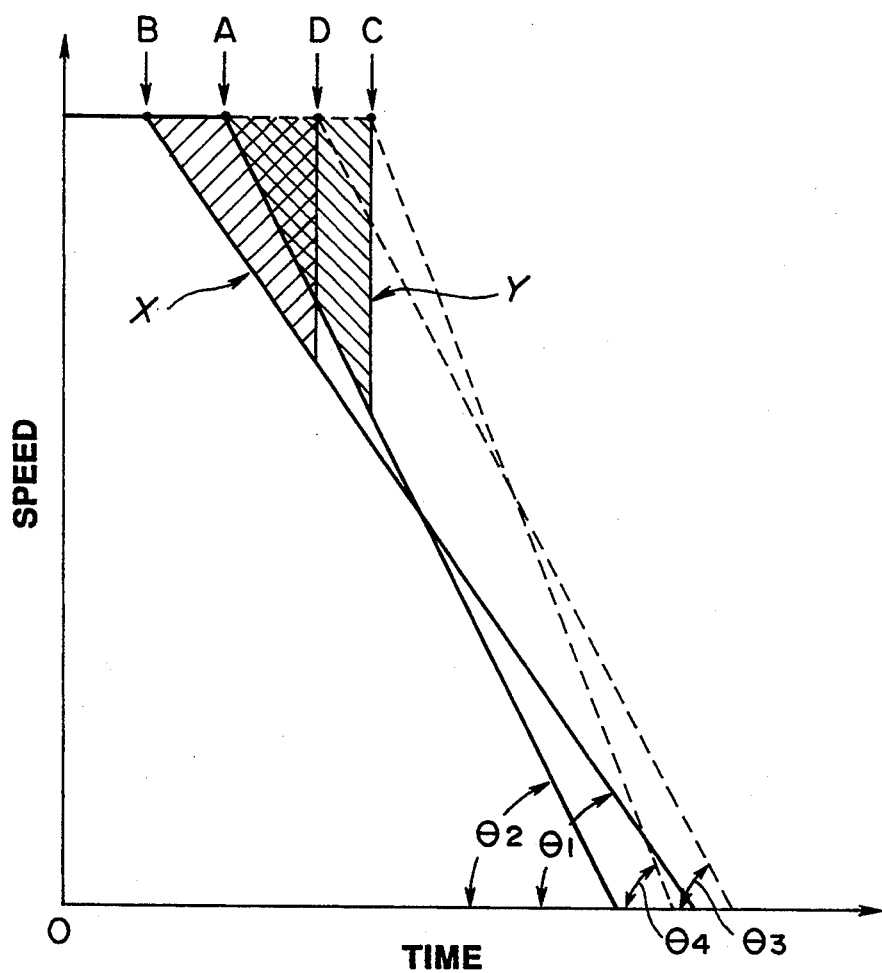
FIG. 5 is a graph showing the advantageous effects of the body mounting structure of the present invention.

It is to be noted that the above-discussed characteristics to suppress or decrease the relative displacement d between the floor panel 8 and the mount bracket 2 (the vehicle frame 1) are very advantageous from the point of view of protecting a vehicle passenger. For example, in the event that a force input is abruptly applied to the vehicle frame 1 under a sudden braking or the like, a deceleration generated in the vehicle takes its modes, indicated by solid lines in FIG. 5, in which the deceleration of the vehicle body starts at a starting point A in the case of a vehicle having a relatively large relative displacement between the floor panel 8 and the mount bracket whereas the deceleration of the vehicle body starts at a starting point B in the case of a vehicle having a relatively small relative displacement. The starting point B is earlier in time than the starting point A. As shown in FIG. 5, an inclination $\Theta_1$ of the deceleration whose starting point is B is smaller than that $\Theta_2$ of the deceleration whose starting point is A.

A deceleration generated in the vehicle passenger takes modes indicated by broken lines in FIG. 5, in which the deceleration of the vehicle passenger stares at a starting point C slightly retarded from the point A in the case of the vehicle having the relatively large relative displacement whereas the deceleration of the vehicle passenger starts at a starting point D slightly retarded from the point D in the case of the vehicle having the relatively small relative displacement. The starting point D is earlier in time than the starting point C. The inclination $\Theta_3$ of the vehicle passenger deceleration which starts at the earlier point D is smaller than that $\Theta_4$ of the vehicle passenger deceleration which starts at the later point C, which corresponds to the smaller inclination of the vehicle body deceleration in the case the relative displacement is relatively small. It will be understood that the smaller inclination $\Theta_3$ of the deceleration applied to the vehicle passenger is advantageous from the point of view of protecting the vehicle passenger. Hatched triangular ranges X and Y in FIG. 5 represent traveling distances of the vehicle respectively in the case of the relatively small relative movement and the case of the relatively large relative movement, in which the ranges X and Y are the same in area in the graph of FIG. 5.

As shown, the stopper bracket 19 project perpendicularly to and outwardly from the vehicle frame member 1. Accordingly, when any outside force is applied to the stopper bracket 19 from the vehicle body side or in the laterally inward direction of the vehicle body, the stopper bracket 19 can be first crushed, thereby absorbing the outside force thus protecting the vehicle frame member 1 from being damaged.

Figure 6:
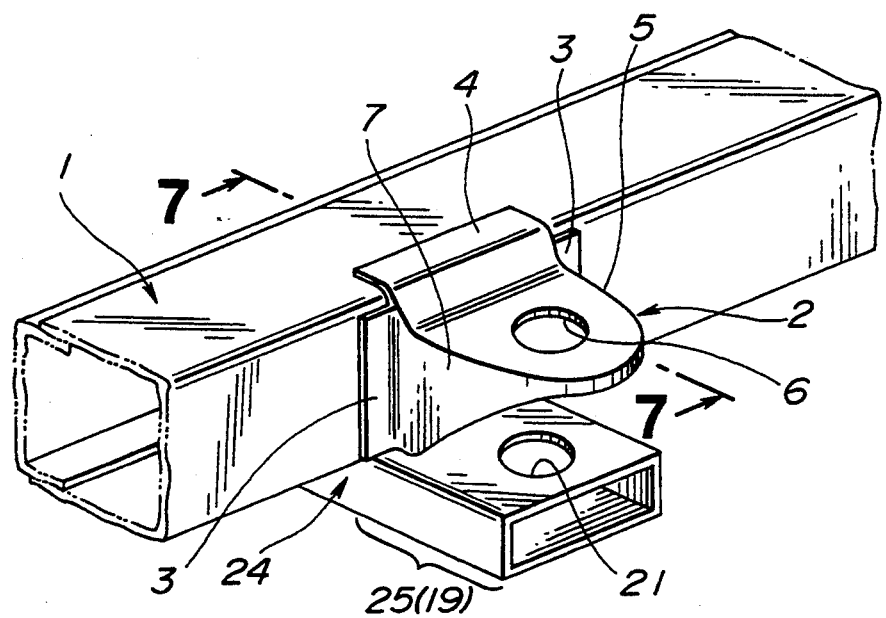
FIG. 6 is a fragmentary perspective view of another embodiment of the body mounting structure in accordance with the present invention.
Figure 7:
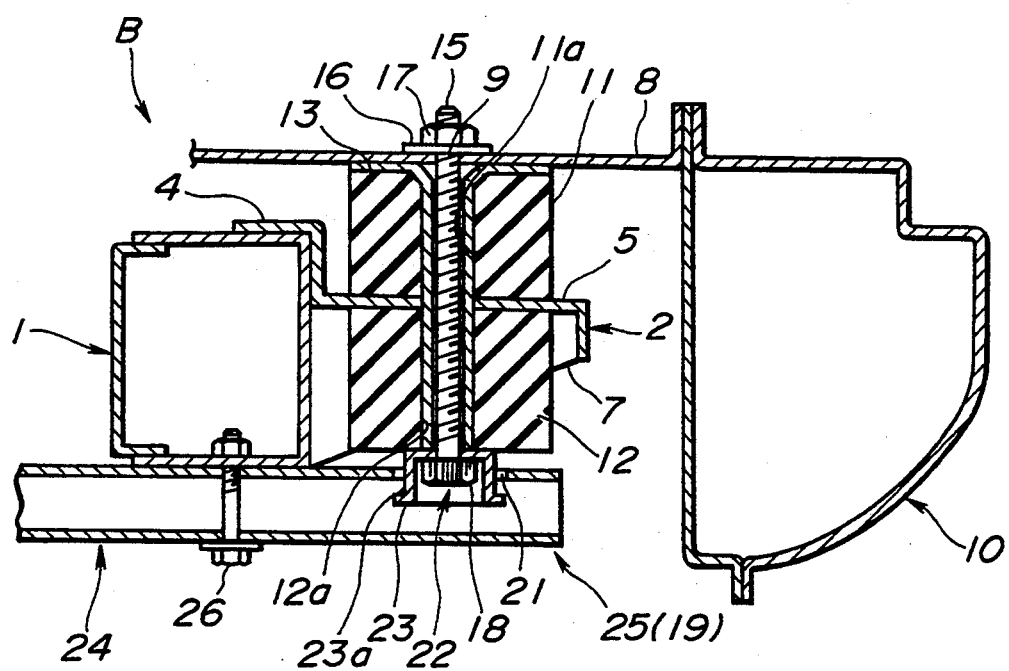
FIG. 7 is a sectional view taken in the direction of the arrows substantially along the line 7—7 of FIG. 6.

FIGS. 6 and 7 illustrate another embodiment of the body mounting structure B in accordance with the present invention, which is similar to that of the embodiment of FIGS. 1 and 2. In this embodiment, a rear engine mount member 24 having a flat rectangular closed-loop sectional shape is located rear of the engine compartment and fixed to the bottom wall of the vehicle frame member 1 under a bolt-and-nut connection 26. An engine (not shown) is mounted on the engine mount member 24. The engine mount member 24 extends laterally outwardly beyond the vehicle frame member 1 to form an extended section 25 which serves as the stopper bracket (19). It will be understood that the engine mount member 24 will not have such an extended section (25) in the usual case.

The thus formed extended section 25 of the engine mount member 24 is formed at its upper wall with the support hole 21. The cup-shaped section 23a of the washer 23 is located inside the support hole 21 in such a manner that the cylindrical wall portion of the cup-shaped section 23a is normally spaced from the periphery of the support hole 21.

Figure 8:
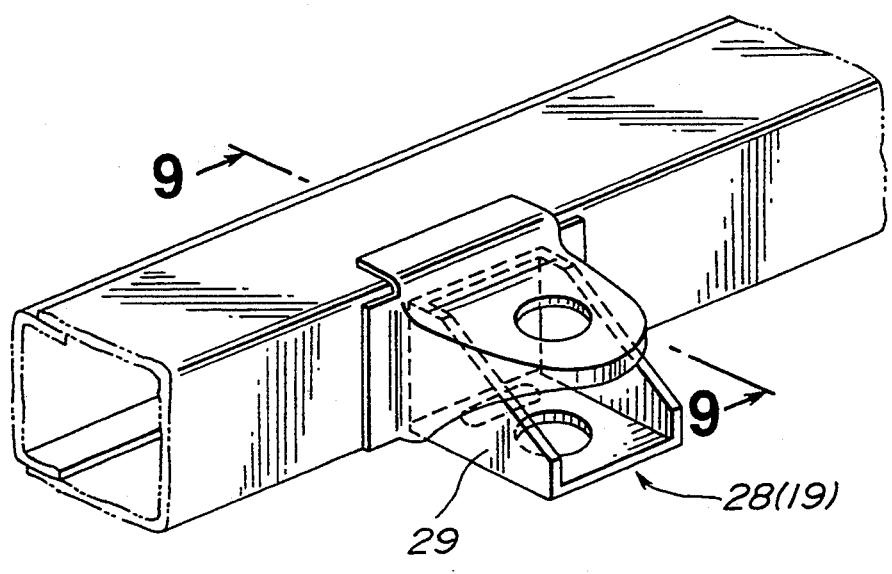
FIG. 8 is a fragmentary perspective view of a further embodiment of the body mounting structure in accordance with the present invention.
Figure 9:
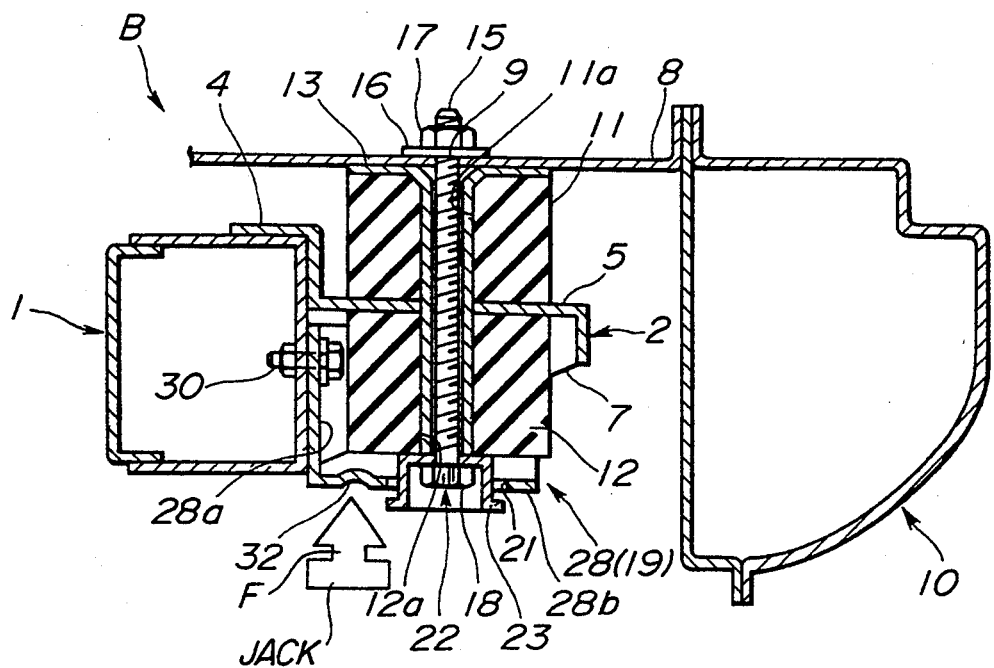
FIG. 9 is a sectional view taken in the direction of arrows substantially along the line 9—9 of FIG. 8.

FIGS. 8 and 9 illustrate a further embodiment of the body mounting structure in accordance with the present invention, which is similar to that of the embodiment of FIGS. 1 and 2. In this embodiment, a jack-up bracket 28 having a generally L-shaped cross-section is fixed to the outer side wall of the vehicle frame member 1. The vehicle is jacked up with a jack (not shown) located to be attached to the jack-up bracket 28. The jack-up bracket 28 includes a base section 28a fixedly attached to the vehicle frame member 1. An extended section 28b is integral with the base section 28a and extends horizontally and formed with the support hole 21. Thus, the jack-up bracket 28 also serves as the stopper bracket 19. As shown in FIG. 9, the cup-shaped section 23a of the washer 23 is located inside the support hole 21 in such a manner that the cylindrical wall portion of the cup-shaped section 23a is normally spaced from the periphery of the support hole 21.

In this embodiment, the extended section 28b of the jack-up bracket 28 is formed with an upwardly projecting bead 32 which increases the rigidity of the extended section 28b at which a concentric force F from the jack is applied. This omits the possibility of deformation of the jack-up bracket 28 even when the force F is concentrically applied to the extended section 28b formed with the support hole 21.

While the cup-shaped washer 23 has been shown and described as located inside the support hole 21 of the stopper bracket 19 or the like, it will be appreciated that the bolt head 18 or the like (i.e., the lower end section of the bolt 15) may be located inside the support hole 21 so as to be able to come into contact with the periphery of the support hole 21.

Although the stopper bracket 19 or the like has been shown and described as a stopper member for restricting the generally horizontal displacement of the lower end section of the bolt 15, it will be understood that the stopper member is not limited to the stopper bracket or the like, so that other devices may be used as the stopper member if they have such a structure as to come into contact with and restrict the displacement of the lower end section of the bolt 15 when a horizontal relative displacement is made between the floor panel 8 and the vehicle frame member 1. For example, the stopper bracket 19 and the like in the above-discussed embodiments may be replaced with a cup-shaped member which is opened upwardly to receive the lower end section of the bolt means 22.

While the floor panel 8 has been shown and described as being mounted directly on the upper insulator 11, it will be appreciated that various modifications may be made. An example of such modifications is as follows: A bracket is fixedly installed to the side sill 10 and is mounted on the insulator 11, upon which the floor panel 8 is mounted on the bracket.

What is claimed is:
1. A body mounting structure for an automotive vehicle, comprising:
 a vehicle frame;
 a mount bracket fixed to said vehicle frame;

upper and a lower insulator placed respectively above and below said mount bracket, a part of a vehicle body being fixedly mounted on said upper insulator;

bolt means extending generally vertically and passing through said mount bracket and said upper and lower insulators to securely connect them together as a unit, said bolt means having a lower end section projecting downwardly from said lower insulator.; and a stopper bracket fixed to said vehicle frame and extending generally horizontally to be contacted by the lower end section of said bolt means, said stopper bracket including restricting and allowing means for restricting a generally horizontal displacement of the lower end section of said bolt means and allowing a generally vertical displacement of the lower end section of said bolt means;

said restricting and allowing means including a support hole having an inner periphery, said lower end section of said bolt means being located in said support hole, the lower end section of said bolt means being spaced from the inner periphery of said support hole even when a generally vertical displacement occurs between said mount bracket and said part of said vehicle body, the lower end section of said bolt means coming into contact with said inner periphery of said support hole when a generally horizontal relative displacement occurs between said mount bracket and said part of said vehicle body;

wherein said bolt means includes a generally cylindrical collar passing through said mount bracket and said upper and lower insulators, a bolt disposed in said collar and having a bolt head projecting downwardly from said lower insulator, and a cup-shaped washer surrounding and contacting the bolt head, said cup-shaped washer being disposed inside said support hole.

2. A body mounting structure for an automotive vehicle, comprising:

a vehicle frame;

a mount bracket fixed to said vehicle frame;

an upper and a lower insulator placed respectively above and below said mount bracket, a part of a vehicle body being fixedly mounted on said upper insulator;

bolt means extending generally vertically and passing through said mount bracket and said upper and lower insulators to securely connect them together as a unit, said bolt means having a lower end section projecting downwardly from said lower insulator; and a stopper bracket fixed to said vehicle frame and extending generally horizontally to be contacted by the lower end section of said bolt means, said stopper bracket including restricting and allowing means for restricting a generally horizontal displacement of the lower end section of said bolt means and allowing a generally vertical displacement of the lower end section of said bolt means;

said restricting and allowing means including a support hole having an inner periphery, said lower end section of said bolt means being located in said support hole, the lower end section of said bolt means being spaced from the inner periphery of said support hole even when a generally vertical displacement occurs between said mount bracket and said part of said vehicle body, the lower end section of said bolt means coming into contact with said inner periphery of said support hole when a generally horizontal relative displacement occurs between said mount bracket and said part of said vehicle body;

a rear engine mount member fixed to said vehicle frame and extending below said lower insulator to form an extended section which serves as said stopper bracket, said extended section including said restricting and allowing means for restricting a generally horizontal displacement of the lower end section of said bolt means and allowing a generally vertical displacement of said lower end section of said bolt means.

3. A body mounting structure as claimed in claim 1, further comprising a jack-up bracket fixedly secured to said vehicle frame and arranged to be in contact with a jack to jack up the vehicle, a part of said jack-up bracket being located below said lower insulator and serving as said stopper bracket, said jack-up bracket part including said restricting and allowing means for restricting a generally horizontal displacement of the lower end section of said bolt means and allowing a generally vertical displacement of said lower end section of said bolt means.

* * * * *